United States Patent [19]
Furui

[11] Patent Number: 5,381,334
[45] Date of Patent: Jan. 10, 1995

[54] FAULT DIAGNOSIS APPARATUS FOR CREW PROTECTING APPARATUS IN VEHICLE

[75] Inventor: Takashi Furui, Hyogo, Japan

[73] Assignee: Mitsubishi Denki Kabushiki Kaisha, Tokyo, Japan

[21] Appl. No.: 996,070

[22] Filed: Dec. 23, 1992

[30] Foreign Application Priority Data

Dec. 26, 1991 [JP] Japan .................................. 3-344681

[51] Int. Cl.6 ..................... G06F 15/50; B60R 21/08
[52] U.S. Cl. ........................ 364/424.03; 364/424.05; 307/10.1; 180/282
[58] Field of Search ................ 364/424.03, 424.05; 340/468, 466, 438, 436; 307/10.1, 9.1; 280/735; 180/271, 282

[56] References Cited

U.S. PATENT DOCUMENTS

| | | | |
|---|---|---|---|
| 4,287,431 | 9/1981 | Yasui et al. | 307/10 R |
| 4,835,513 | 5/1989 | McCurdy et al. | 340/438 |
| 4,873,452 | 10/1989 | Morota et al. | 307/10.1 |
| 4,945,336 | 7/1990 | Itoh et al. | 340/438 |
| 4,950,914 | 8/1990 | Kurihara et al. | 307/10.1 |
| 4,956,631 | 9/1990 | Itoh | 340/436 |
| 4,958,851 | 9/1990 | Behr et al. | 280/735 |
| 4,999,775 | 3/1991 | Muraoka | 364/424.03 |
| 5,045,835 | 9/1991 | Masegi et al. | 340/438 |
| 5,122,780 | 6/1992 | Midorikawa et al. | 340/438 |
| 5,164,901 | 11/1992 | Blackburn et al. | 364/424.05 |
| 5,166,880 | 11/1992 | Furui | 364/424.05 |

FOREIGN PATENT DOCUMENTS

| | | |
|---|---|---|
| 2808872 | 9/1979 | Germany . |
| 3001780 | 7/1981 | Germany . |
| 63-241467 | 6/1988 | Japan . |

*Primary Examiner*—Kevin J. Teska
*Assistant Examiner*—Tan Q. Nguyen

[57] ABSTRACT

The fault diagnosis apparatus includes an electronic acceleration sensor and mechanical acceleration sensor. Strength of an impact of the vehicle is calculated based on the acceleration detected by the electronic acceleration sensor. A first comparator compares the calculated strength of the impact to a predetermined strength, and a second comparator compares the acceleration detected by the mechanical acceleration sensor to a predetermined acceleration. When the first comparator indicates that the strength of impact is greater than or equal to the predetermined strength and the second comparator indicates that the acceleration detected by the mechanical acceleration sensor is greater than the predetermined acceleration, a crew protecting apparatus operates. On the other hand, when the second comparator indicates that the acceleration detected by the mechanical acceleration sensor is less than or equal to the predetermined acceleration, a fault diagnosis of the crew protecting apparatus is carried out. Furthermore, when the second comparator indicates that the acceleration detected by the mechanical acceleration sensor becomes greater than the predetermined acceleration during the fault diagnosis, the fault diagnosis process stops and the crew protecting apparatus is placed in a state capable of being operated.

35 Claims, 7 Drawing Sheets

FAULT DIAGNOSIS APPARATUS FOR CREW PROTECTING APPARATUS IN VEHICLE

BACKGROUND OF THE INVENTION

1. Field of the Invention

The present invention relates to a fault diagnosis apparatus for a crew protective apparatus which detects a collision of a car and operates, for example, an air bag, a seat belt pretensioner or the like.

2. Description of the Prior Art

Figure 8:
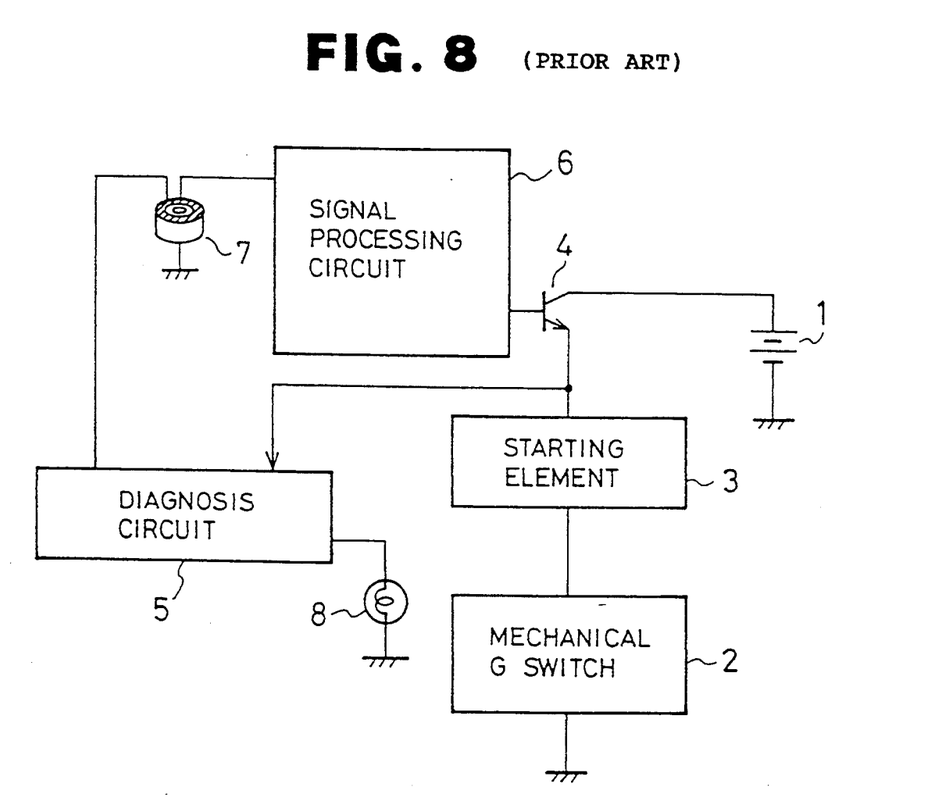
FIG. 8 is a block diagram showing constitution of a fault detection apparatus of a car in the prior art.

FIG. 8 is a block diagram showing constitution of a collision detection apparatus of a car, such as disclosed in Japanese patent application laid-open No. 241467/1988. In FIG. 8, numeral 1 designates a DC power source such as a battery to be held on a car, numeral 2 designates a mechanical G switch in which contacts are closed by acceleration of a collision (hereinafter acceleration is referred to as "G"), numeral 3 designates a starting element called squib of a crew protecting apparatus, numeral 4 designates a transistor for switching currents flowing from the DC power source 1 to the starting element 3, numeral 5 designates a diagnosis circuit for carrying out fault diagnosis of the collision detection apparatus, numeral 6 designates a signal processing circuit which processes acceleration signals of the car at deceleration state and produces the amount of a collision and controls the transistor 4, numeral 7 designates an electronic G sensor which detects acceleration of the car at a deceleration state and outputs the detected acceleration to the signal processing circuit 6, and numeral 8 designates an alarm lamp which is lit when the diagnosis circuit detects a fault.

Next, operation will be described. The electronic G sensor 7 converts the amount of acceleration of the car at a deceleration state into electric signal and outputs the signal to the signal processing circuit 6. The signal processing circuit 6 performs signal processing such as integrating, amplifying, comparing the electric signal from the electronic G sensor 7 thereby a collision of the car is detected, and when the circuit 6 determines that an air bag must be unfolded, the transistor 4 is turned on. In this case, the mechanical G switch 2 is also turned on by the impact of a collision, and a current flows from the DC power source 1 through starting element 3 and the crew protecting apparatus is started.

On the other hand, the diagnosis circuit 5 forcedly operates the electronic G sensor 7 and the signal processing circuit 6 turns the transistor 4 on, and the terminal voltage of the transistor 4 is detected, thereby it is diagnosed whether or not the collision detection circuit constituted by the electronic G sensor 7, the signal processing circuit 6 and the transistor 4 operates normally, and if an abnormal state exists, the alarm lamp 8 is lit.

In this case, the diagnosis circuit 5 is supplied with car speed signal and parking brake signal being not shown, so that the fault diagnosis to turn the transistor 4 on is carried out only while the car is stopped.

Since the crew protecting apparatus is constituted as above described, in order to carry out the fault diagnosis of the collision detection circuit while the car is stopped, car speed signal, parking brake signal or the like must be taken and a harness or an interface circuit therefor must be provided in surplus.

SUMMARY OF THE INVENTION

An object of the present invention is to provide a fault diagnosis apparatus capable of carrying out the fault diagnosis of a crew protecting apparatus without the need of signals from the outside only while the crew protecting apparatus is not required.

The present invention achieves this and other objectives by providing a fault diagnosis apparatus with an electronic acceleration sensor and a mechanical acceleration sensor. Strength of an impact of a vehicle is calculated based on acceleration detected by the electronic sensor. When the impact is a predetermined value or more and the mechanical acceleration sensor detects the acceleration, the crew protecting apparatus is started. On the other hand, when the mechanical acceleration sensor does not detect the acceleration, a fault of the crew protecting apparatus is diagnosed. Therefore, for example, car speed signal or the like need not be introduced from the outside.

DETAILED DESCRIPTION OF THE PREFERRED EMBODIMENTS

Figure 1:
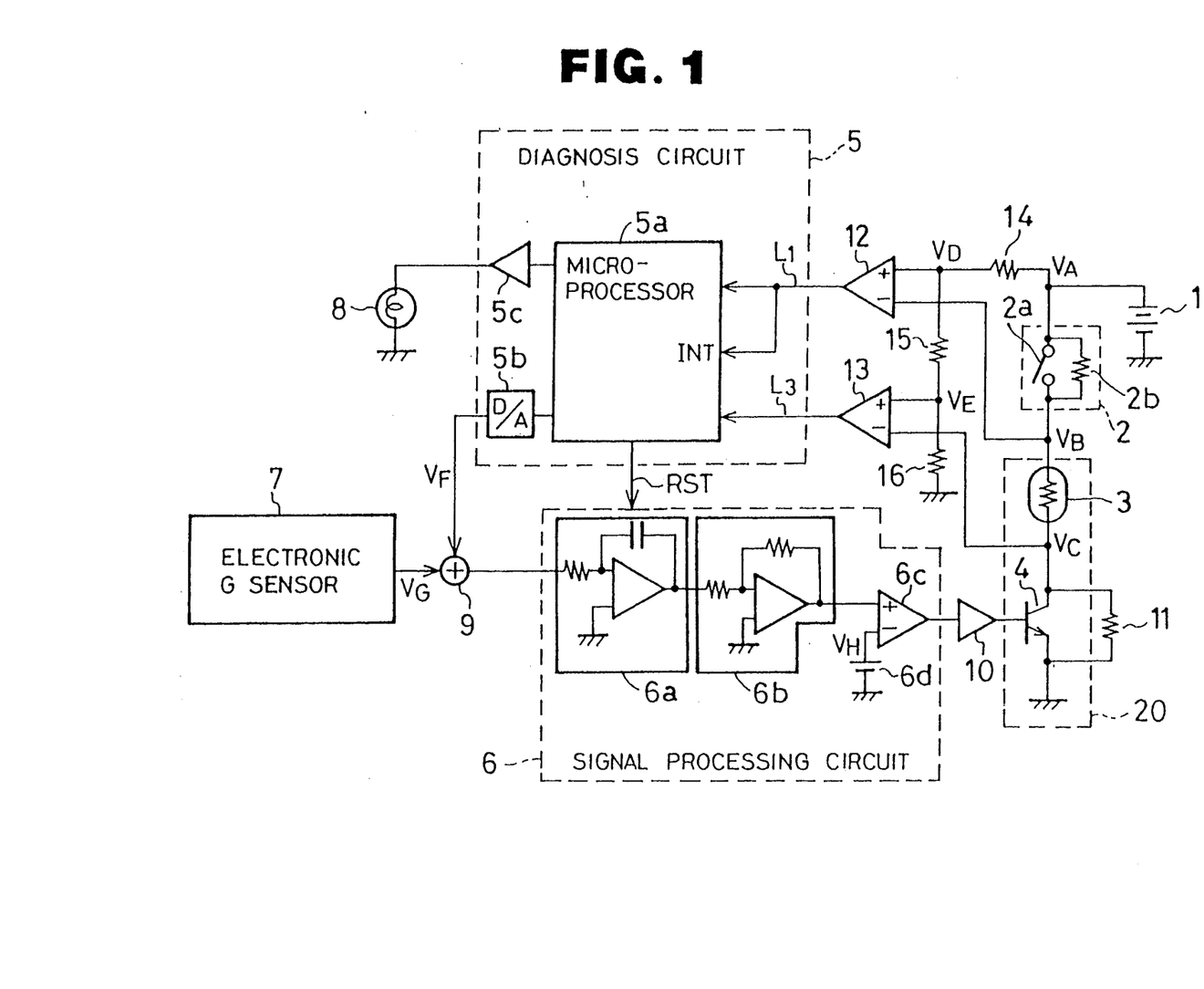
FIG. 1 is a circuit diagram showing constitution of a fault diagnosis apparatus of a crew protecting apparatus by a first embodiment of the invention.

An embodiment of a fault diagnosis apparatus of a crew protecting apparatus of the present invention will be described as follows. FIG. 1 is a circuit diagram showing constitution of the embodiment. In FIG. 1, parts designated by reference numerals 1–8 are similar to those shown in FIG. 8 in the prior art.

In FIG. 1, mechanical G switch 2 is connected between a DC power source 1 and a starting element 3. The mechanical G switch 2 is constituted by contacts 2a and a resistor 2b connected in parallel.

Also diagnosis circuit 5 is constituted by a microprocessor 5a for fault diagnosis, a digital/analog (hereinafter referred to as "D/A") converter 5b for converting output signals of the microprocessor 5a into analog signals, and a buffer 5c for driving an alarm lamp 8.

Also a signal processing circuit 6 is constituted by an integrator 6a, an amplifier 6b, a comparator 6c and a reference power source 6d. The integrator 6a integrates output signals of an adder 9, and output signals of the integrator 6a are introduced through the amplifier 6b to the plus input terminal of the comparator 6c. Voltage $V_H$ of the reference power source 6d is applied to the input end of the comparator 6c.

Output signals of the signal processing circuit 6, that is, output signals of the comparator 6c pass through a buffer 10 and drive the transistor 4. A resistor 11 is connected between the collector and the emitter of the transistor 4. The collector of the transistor 4 is connected through the mechanical G switch 2 to the positive pole of the DC power source 1. The starting element 3 and the transistor 4 constitute a starting means 20.

The collector of the transistor 4 is also connected to the minus input terminal of comparator 13. The minus input terminal of comparator 12 is connected to the joint between the starting element 3 and the mechanical G switch 2. The plus input terminal of the comparator 12 is connected through dividing resistor 14 to the positive pole of the DC power source 1. Series circuit of dividing resistors 14, 15, 16 is connected between the positive pole and ground. The joint between the resistors 15 and 16 is connected to the plus input terminal of the comparator 13.

Output signals of the comparator 12 are inputted to the microprocessor 5a of the diagnosis circuit 5. Also output signals of the comparator 13 are inputted to the microprocessor 5a.

On the other hand, output signals $V_F$ of the D/A converter 5b and output signal $V_G$ of an electronic G sensor 7 are added in the adder 9, and the adding results are inputted to the integrator 6a.

Next, collision detection operation in the embodiment of FIG. 1 will be described. Contacts 2a of the mechanical G switch 2 are set to be closed even at a relatively weak collision, and the electronic G sensor 7 and the signal processing circuit 6 at the rear stage thereof effect decision regarding whether the crew protecting apparatus should be actually operated or not.

The electronic G sensor 7 converts acceleration of the car at a deceleration state into voltage signals $V_G$, which are inputted through the adder 9 to the integrator 6a of the signal processing circuit 6. Voltage signals $V_G$ are integrated by the integrator 6a and amplified by the amplifier 6b and inputted to the plus input terminal of the comparator 6c.

In the comparator 6c, output signal of the amplifier 6b and the reference voltage $V_H$ are compared, and if the integrated and amplified value of the voltage signal $V_G$ exceeds the voltage $V_H$ of the reference power source 6d, decision is made that the deceleration, that is, the collision requiring an operation of the crew protecting apparatus has occurred, and the output signal of the comparator 6c becomes "H" and passes through the buffer 10 and turns the transistor 4 on.

In this case, both the mechanical G switch 2 and the transistor 4 are closed, and current is supplied from the DC power source 1 to the starting element 3 and the crew protecting apparatus operates.

Next, processing procedure by the microprocessor 5a in the embodiment shown in FIG. 1 will be described according to a flow chart of FIG. 2. First, in step S1, fault diagnosis is started, and the plus input terminal of the comparator 12 is applied by the voltage $V_D$, i.e., the voltage $V_A$ of the DC power source 1 being divided by the resistors 14, 15, 16. Also the minus input terminal of the comparator 12 is applied by the voltage VB at the joint between the mechanical G switch 2 and the starting element 3.

Figure 2:
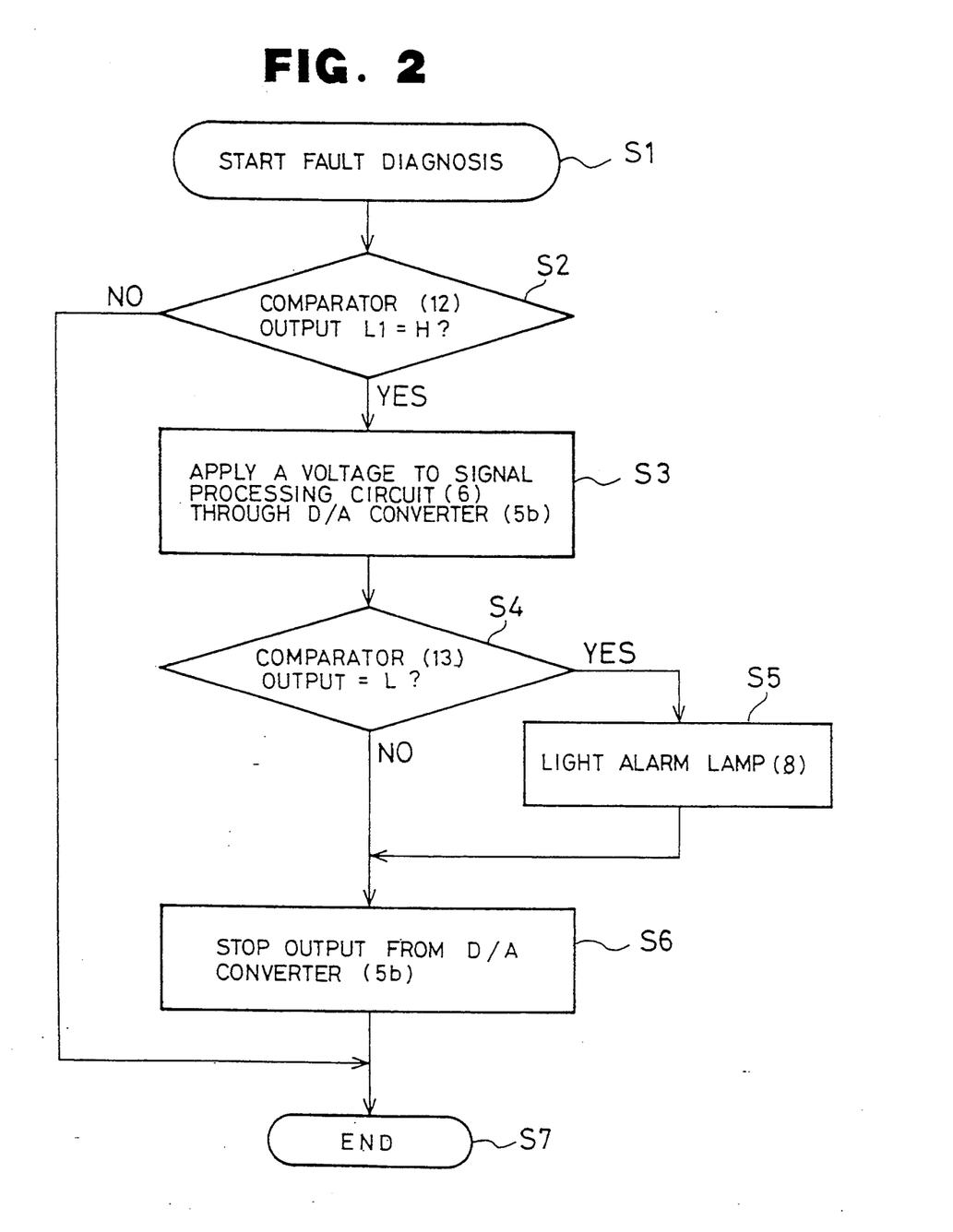
FIG. 2 is a flow chart showing processing procedure of a microprocessor in a diagnosis circuit in the first embodiment.

In this case, when contacts 2a of the mechanical G switch 2 are opened, the resistors 14, 15, 16 are set so that $V_D > V_B$, and the output signal L1 of the comparator 12 becomes "H", and processing in FIG. 2 advances to "Y" in step S2 and the fault diagnosis is started.

Next, in step S3, the voltage $V_F$ is outputted from the D/A comparator 5b and is applied through the adder 9 to the integrator 6a of the signal processing circuit 6. Since the output signal $V_F$ from the D/A converter 5b is set to such amount that the output signal of the comparator 6c becomes "H", the transistor 4 is turned on in the normal state.

The comparator 13 compares the collector voltage $V_C$ of the transistor 4 with the voltage $V_E$, i.e., the voltage $V_A$ of the DC power source 1 being divided by the resistors 14, 15, 16.

Next, in step S4, when the output of the comparator 13 is "H" that is when the transistor 4 is turned on and $V_C < V_E$, decision is made that a current state is normal, and processing advances from the "N" side of step S4 to step S6. On the contrary, when the output of the comparator 13 is "L", that, is when the transistor 4 is turned off and $V_C > V_E$, decision is made that a current state is abnormal, and processing advances from the "Y" side of step S4 to step S5.

In step S5, in order to inform the abnormal state to the driver, the alarm lamp 8 is lit.

Finally, in step S6, the voltage $V_F$ from the D/A converter 5b is stopped. On the other hand, when the contacts 2a of the mechanical G switch 2 are closed, since $V_D < V_B$, the output L1 of the comparator 12 becomes "L", and in step S2 of FIG. 2, processing advances to "N" and is finished without carrying out the fault diagnosis.

Figure 3:
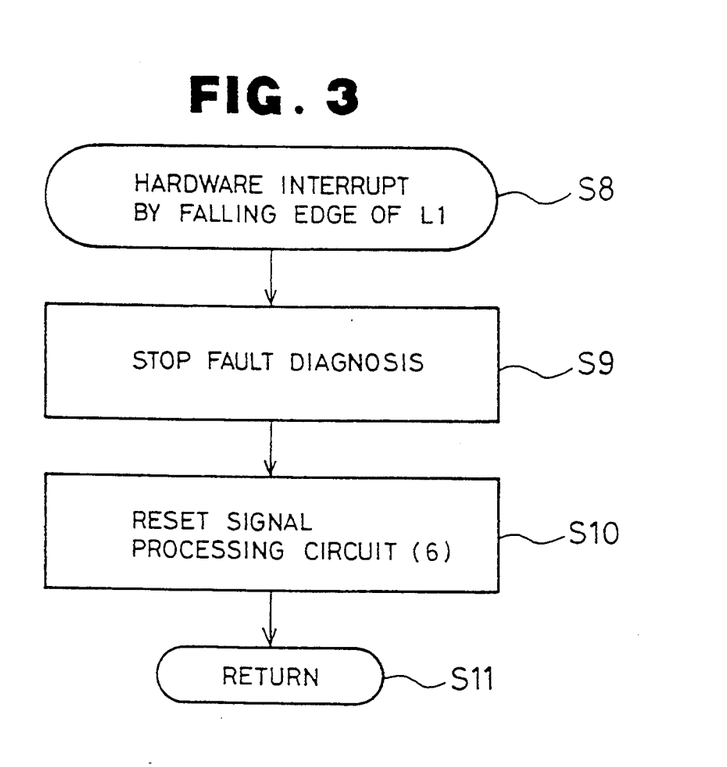
FIG. 3 is a flow chart of an interrupt processing routine in the midst of fault diagnosis in the first embodiment.

When the mechanical G switch 2 is closed, the microprocessor 5a is interrupted by the falling edge of the output L1 of the comparator 12. Consequently, when the interrupt is generated in the midst of the fault diagnosis shown in FIG. 2, processing transfers to step S8 of FIG. 3, and for the preparation of the collision detection, the fault diagnosis is immediately stopped in step S9, and in step S10, the signal processing circuit 6 is reset by the output signal RST, and in step S11, the interrupt processing is finished and the processing is returned to the normal state.

Figure 4:
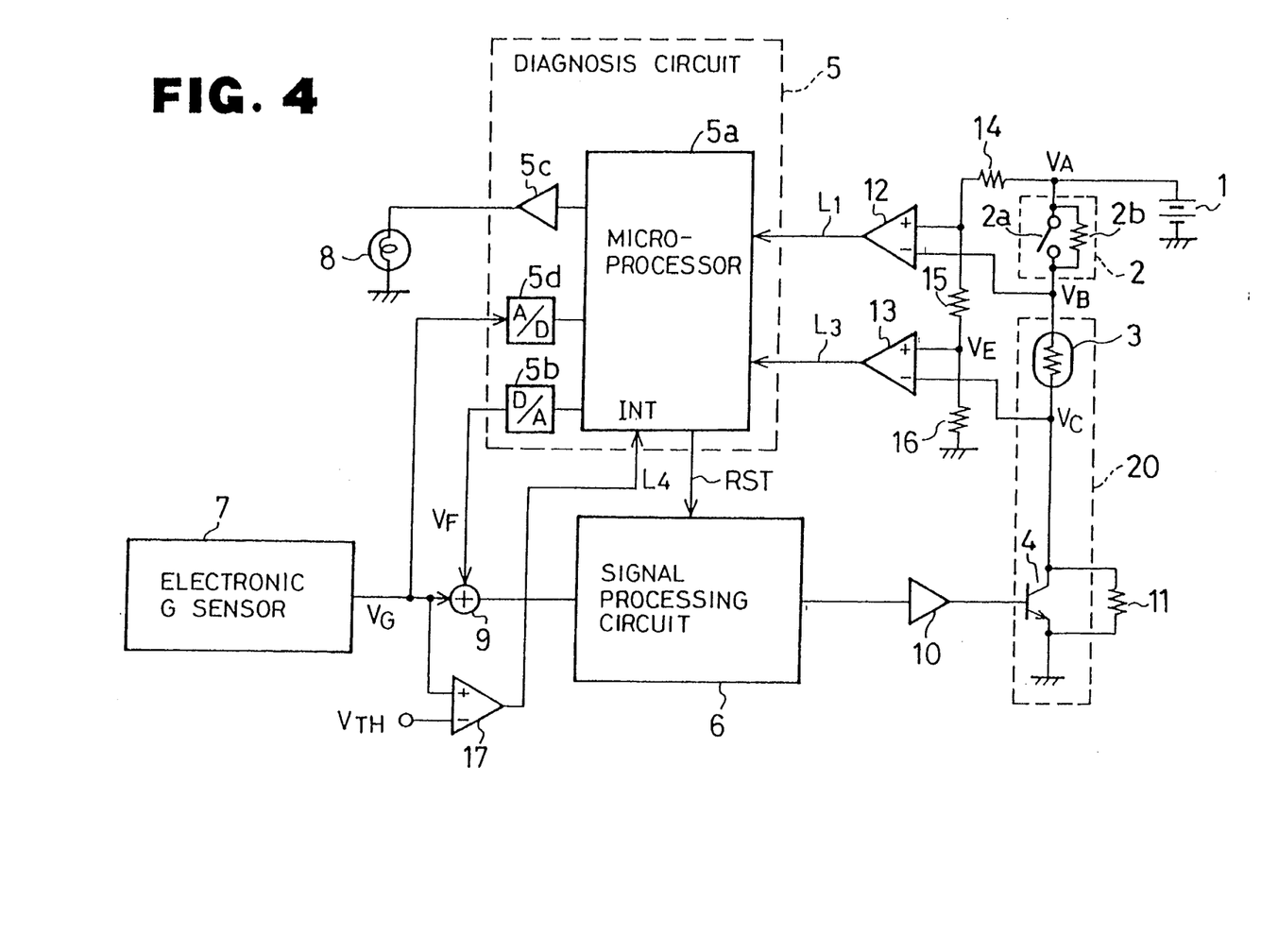
FIG. 4 is a circuit diagram showing constitution of a fault diagnosis apparatus of a crew protecting apparatus in a second embodiment of the invention.

Next, the second embodiment of the present invention will be described. FIG. 4 is a circuit diagram showing its constitution. In FIG. 4, parts designated by reference numerals 1-16 are similar to those shown in the embodiment of FIG. 1 and therefore the repeated description shall be avoided here.

In FIG. 4, numeral 5d designates an analog/digital (hereinafter referred to as "A/D") converter for carrying out digital conversion of output signals of the electronic G sensor 7, and digital signals output from the A/D conversion are input to the microprocessor 5a.

Also numeral 17 designates a comparator where output signal $V_G$ of the electronic G sensor 7 is introduced to the plus input terminal and the constant voltage $V_{TH}$ is applied to the minus input terminal and both are compared. Output signal L4 of the comparator 17 is input to the microprocessor 5a. Other constitution is similar to FIG. 1.

Next, operation of the second embodiment will be described. The collision detection operation is similar to the first embodiment of FIG. 1 and therefore the repeated description shall be avoided here, and the fault diagnosis will be described according to a flow chart of processing procedure of the microprocessor 5a shown in FIG. 5.

Figure 5:
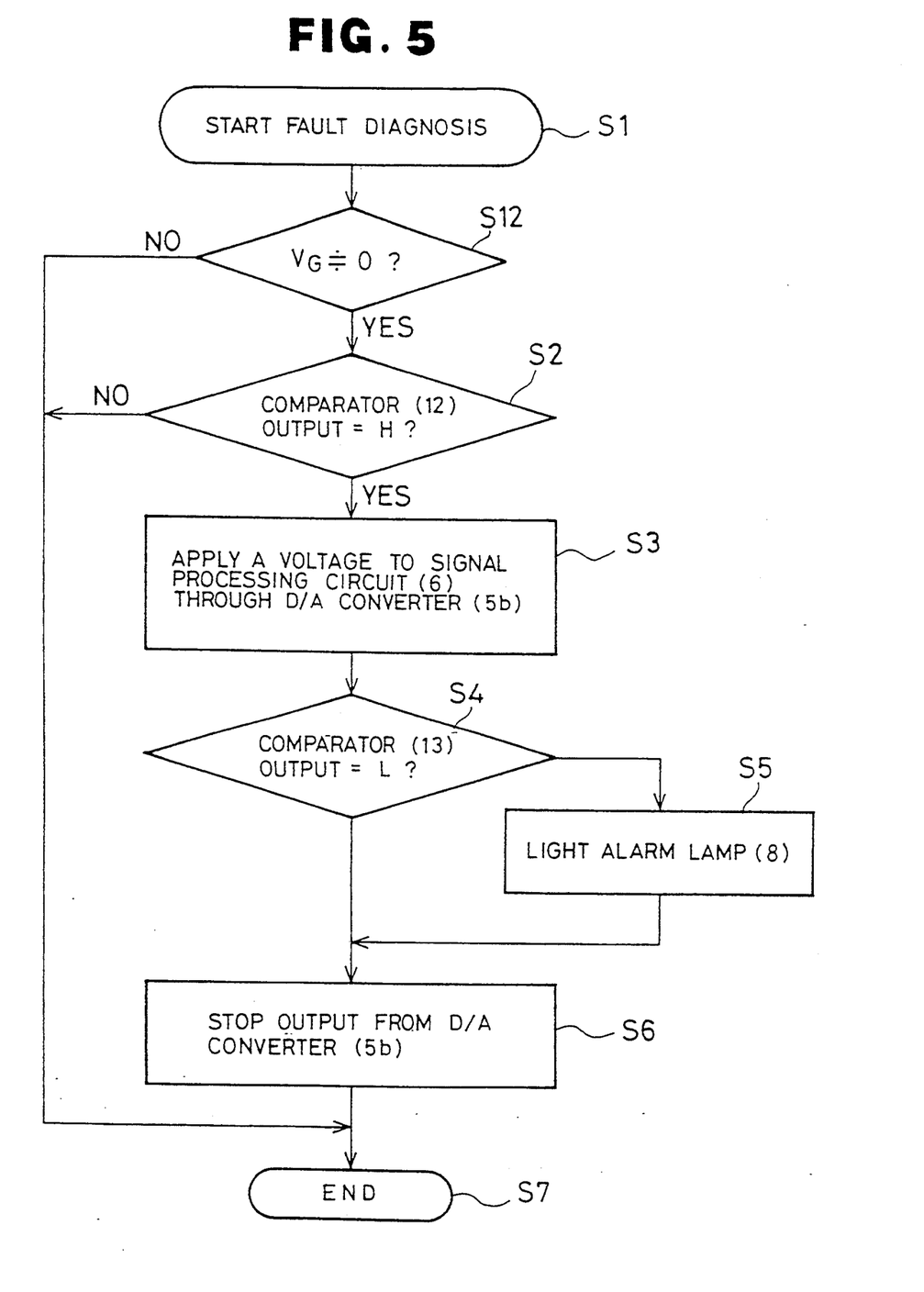
FIG. 5 is a flow chart showing processing procedure of a microprocessor in a diagnosis circuit in the second embodiment.

In FIG. 5, processing in steps S1–S7 is similar to FIG. 2 and processing in step S12 is newly added. In step S12, at the beginning of the fault diagnosis, the voltage signal $V_G$ of the electronic G sensor 7 is monitored through the A/D converter 5d. If $V_G=0$, that is, if the output signal $V_G$ of the electronic G sensor 7 is not generated, the processing advances to step S2 so as to start the fault diagnosis. Otherwise, the processing is finished without carrying out the fault diagnosis.

Figure 6:
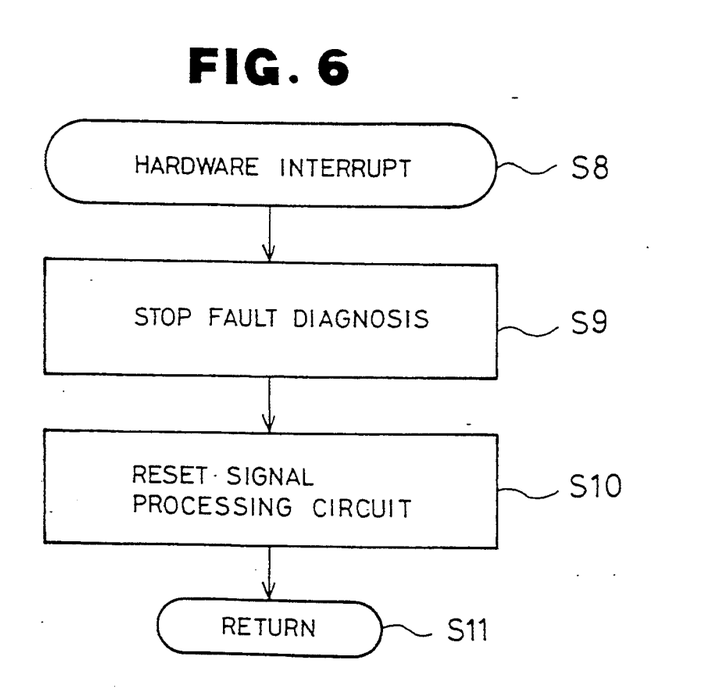
FIG. 6 is a flow chart of an interrupt processing routine in the midst of fault diagnosis in the second embodiment.

In addition, if the voltage signal $V_G$ of the electronic G sensor 7 exceeds the constant voltage $V_{TH}$, microprocessor 5a is interrupted by the rising edge of the output signal L4 of the comparator 17. Consequently, when the interrupt is generated in the midst of the fault diagnosis shown in FIG. 5, processing transfers to step S8 of FIG. 6, and for the preparation of the collision detection, the fault diagnosis is immediately stopped in step S9, and in step S10, the signal processing circuit 6 is reset by the output signal RST of the microprocessor 5a, and in step S11, the interrupt processing is finished and the processing is returned to the normal state.

Figure 7:
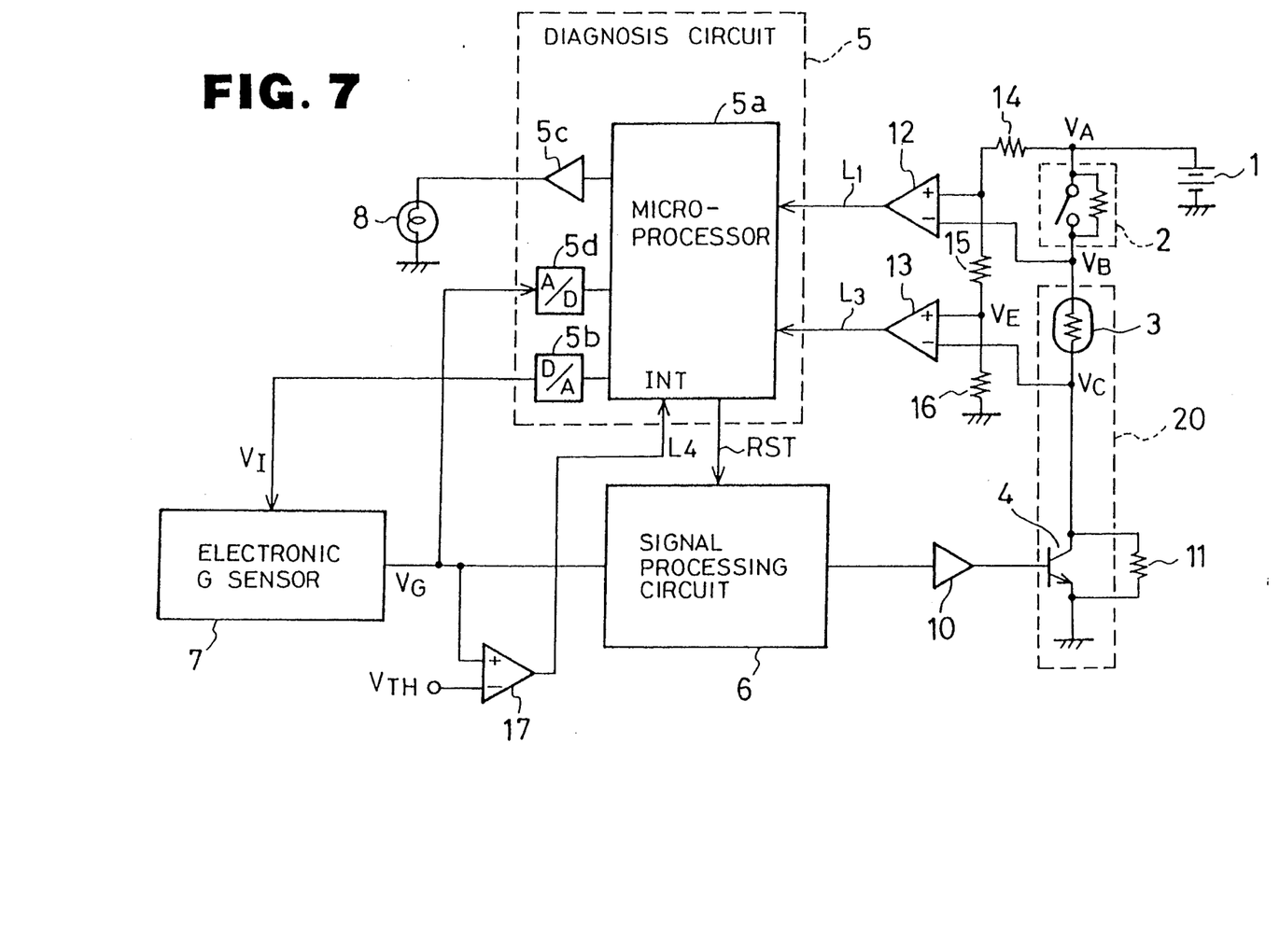
FIG. 7 is a circuit diagram showing constitution of a fault diagnosis apparatus of a crew protecting apparatus in a third embodiment of the invention.

Next, the third embodiment of the present invention will be described. FIG. 7 is a circuit diagram showing constitution of the third embodiment. In each of the first and second embodiments, the voltage $V_F$ from the diagnosis circuit 5 is applied through the adder 9 to the signal processing circuit 6, but when the electronic G sensor 7 is piezo-electric type, as shown in FIG. 7, the voltage signal $V_I$ may be applied to the electronic G sensor 7 and the transistor 4 as switching element may be operated.

As above described, since the switching of the mechanical G switch is watched and the fault diagnosis of the collision detection circuit is carried out only when the mechanical G switch is not operated, even if the car speed signal or the like from the outside is not taken and watched, the crew protecting apparatus is not erroneously operated during the fault diagnosis, thereby the fault diagnosis with safety can be carried out at a lower cost.

Also since the fault diagnosis of the collision detection circuit is carried out only when the output of the electronic G sensor is not generated, the fault diagnosis can be carried out securely.

What is claimed is:

1. A fault diagnosis apparatus for a crew protecting apparatus which protects the crew of a vehicle, comprising:
    a first acceleration sensor for detecting acceleration of said vehicle;
    signal processing means for calculating a strength of impact applied to said vehicle based on the acceleration detected by said first acceleration sensor;
    first comparing means for comparing the calculated strength of impact with a predetermined strength of impact;
    a second acceleration sensor for detecting acceleration of said vehicle;
    second comparing means for comparing acceleration detected by said second acceleration sensor to a predetermined acceleration;
    starting means for starting said crew protecting apparatus, as a result of comparison by said first comparing means, when the strength of the impact is larger than the predetermined strength and, as a result of comparison by said second comparing means, when the acceleration detected by said second acceleration sensor is larger than said predetermined acceleration;
    diagnosis signal output means for outputting a signal indicating the predetermined strength of impact for fault diagnosis to said signal processing means, as a result of comparison by said second comparing means, when the acceleration detected by said second acceleration sensor is less than or equal to said predetermined acceleration; and
    diagnosis means for executing a diagnosis regarding whether said starting means is operating normally or abnormally, when said signal indicating the predetermined strength of impact is output to said signal processing means.

2. A fault diagnosis apparatus as set forth in claim 1, wherein said second acceleration sensor has an acceleration switch which is turned on when said predetermined acceleration is sensed and wherein said diagnosis signal output means does not output said signal indicating the predetermined strength of impact for the fault diagnosis to said signal processing means while said acceleration switch is turned on.

3. A fault diagnosis apparatus as set forth in claim 2, further comprising:
    a power source for generating a predetermined voltage; and wherein
    said starting means has switching means for turning on and off based on a comparison result by said first comparing means, and an electric resistor starting element for operating said crew protecting apparatus when a predetermined current flows; and
    said acceleration switch, said switching means, said starting element and said power source are connected in series.

4. A fault diagnosis apparatus as set forth in claim 3, further comprising:
    a first resistor of a predetermined resistance value connected in parallel to said second acceleration sensor, and a second resistor of a predetermined resistance value connected in parallel to said switching means and wherein
    said diagnosis means detects a voltage at one end of said switching means, and determines said crew protecting apparatus to be operating abnormally when the voltage is greater than a first predetermined voltage or less than a second predetermined voltage.

5. A fault diagnosis apparatus as set forth in claim 4, wherein
    said diagnosis means includes a microprocessor which inputs, as digital signals, information regarding whether said acceleration switch if turned on or not and information regarding the voltage at the end of said switching means; and
    said diagnosis signal output means includes a digital to analog (D/A) converter which converts digital signals output by said microprocessor indicating the predetermined strength of impact into analog signals, said analog signals being output to said signal processing means.

6. A fault diagnosis apparatus as set forth in claim 5, wherein
    said microprocessor includes an interrupt terminal which receives ON/OFF information of said acceleration switch, and if said acceleration switch is turned on while said diagnosis means carries out a diagnosis, said microprocessor stops the diagnosis of said diagnosis means by interrupt processing and places said crew protecting apparatus in a state capable of being started.

7. A fault diagnosis apparatus as set forth in claim 6, wherein said signal processing means has integration processing means for carrying out integration processing of signals received by said signal processing means.

8. A fault diagnosis apparatus as set forth in claim 7, further comprising reset means for resetting said integration processing means when the fault diagnosis of said diagnosis means is stopped by said diagnosis stopping means.

9. The apparatus of claim 4, further comprising:
indicating means for indicating to a vehicle operator when said diagnosing means determines that said crew protecting apparatus is operating abnormally.

10. A fault diagnosis apparatus as set forth in claim 1, wherein
said diagnosis means includes a microprocessor which inputs, as digital signals, information representing the results of the comparison performed by said first and second comparing means and information regarding the operation of said starting means; and
said diagnosis signal output means includes a digital to analog (D/A) converter which converts digital signals output by said microprocessor indicating the predetermined strength of impact into digital signals, said analog signals being output to said signal processing means.

11. A fault diagnosis apparatus as set forth in claim 1, further comprising diagnosis stopping means for stopping a diagnosis by said diagnosis means, and for placing said crew protecting apparatus in a state capable of being started, if output from said second comparing means indicates that the acceleration detected by said second acceleration sensor is larger than the predetermined acceleration while said diagnosis means carries out a diagnosis.

12. A fault diagnosis apparatus as set forth in claim 11, further comprising reset means for resetting said signal processing means when said diagnosis is stopped by said diagnosis stopping means.

13. A fault diagnosis apparatus as set forth in claim 1, wherein said diagnosis means executes the diagnosis only when the acceleration detected by said first acceleration sensor is substantially zero.

14. A fault diagnosis apparatus as set forth in claim 1, further comprising diagnosis stopping means for stopping the diagnosis by said diagnosis means and for placing said crew protecting apparatus in a state capable of being started if the acceleration sensed by said first acceleration sensor becomes greater than or equal to a another predetermined acceleration while said diagnosis means carries out a diagnosis.

15. A fault diagnosis apparatus as set forth in claim 1, wherein said first acceleration sensor detects acceleration of said vehicle at a deceleration state.

16. A fault diagnosis apparatus for a crew protecting apparatus in a vehicle, comprising:
a piezo-electric sensor for detecting acceleration of said vehicle;
signal processing means for calculating strength of impact applied to said vehicle based on the acceleration detected by said piezo-electric acceleration sensor;
first comparing means for comparing the calculated strength of impact with a predetermined strength;
a mechanical acceleration sensor for detecting acceleration of said vehicle;
second comparing means for comparing acceleration detected by said mechanical acceleration sensor to a predetermined acceleration;
starting means for starting said crew protecting apparatus, as a result of comparison by said first comparison means, when the strength of impact is larger than the predetermined strength and, as a result of comparison by said second comparing means, when the acceleration detected by said mechanical acceleration sensor is larger than said predetermined acceleration;
voltage applying means for applying a voltage of a predetermined value for a fault diagnosis to said piezo-electric acceleration sensor, when the acceleration detected by said piezo-electric sensor is a predetermined acceleration or less; and
diagnosis means for executing a diagnosis regarding whether said starting means is operating normally or abnormally when said voltage of said predetermined value is applied to said piezo-electric acceleration sensor.

17. A crew protecting apparatus to protect a crew of vehicle, comprising:
an electronic acceleration sensor for detecting acceleration of said vehicle;
signal processing means for calculating strength of impact applied to said vehicle based on the acceleration detected by said electronic acceleration sensor;
first comparing means for comparing the calculated strength of impact with a predetermined strength of impact;
a mechanical sensor for detecting acceleration of said vehicle;
second comparing means for comparing acceleration detected by said mechanical acceleration sensor to a predetermined acceleration;
protecting operation means for executing a crew protecting operation, as a result of the comparison by said first comparing means, when the strength of impact is larger than the predetermined strength of impact and, as a result of comparison by said second comparing means, when the acceleration detected by said mechanical acceleration sensor is larger than said predetermined acceleration;
diagnosis signal output means for outputting a signal indicating the predetermined strength of impact for fault diagnosis to said signal processing means, as a result of comparison by said second comparing means, when the acceleration detected by said mechanical acceleration sensor is less than or equal to said predetermined acceleration; and
diagnosis means for executing a diagnosis regarding whether said protecting operation means is operating normally or abnormally when the signal indicating the predetermined strength of impact is output to said signal processing means.

18. A fault diagnosis method for diagnosing a fault of a crew protecting apparatus for a vehicle, comprising the steps of:
detecting acceleration of said vehicle using an electronic acceleration sensor;
calculating strength of impact applied to said vehicle based on the detected acceleration;

detecting acceleration of said vehicle using a mechanical acceleration sensor;

comparing acceleration detected by said mechanical acceleration sensor to a predetermined acceleration;

starting said crew protecting apparatus, when the calculated strength of impact is larger than a predetermined strength and when said comparing step indicates that the acceleration detected by said mechanical acceleration sensor is larger than said predetermined acceleration; and executing a diagnosis regarding whether said crew protecting apparatus is operating normally or abnormally when said comparing step indicates that the acceleration detected by said mechanical acceleration sensor is said predetermined acceleration or less.

19. A fault diagnosis method as set forth in claim 18, further comprising the step of stopping the diagnosis and placing said crew protecting apparatus in a state capable of being started when said comparing step indicates that the acceleration detected by said mechanical acceleration sensor becomes larger than said predetermined acceleration during execution of the diagnosis.

20. A method for diagnosing a crew protecting apparatus, comprising the steps of:

first detecting vehicle acceleration using a first acceleration sensor;

calculating a strength of impact of the vehicle based on said first detected vehicle acceleration;

first comparing said calculated strength of impact to a predetermined strength of impact;

second detecting vehicle acceleration using a second acceleration sensor;

second comparing said second detected vehicle acceleration to a predetermined acceleration;

enabling said crew protecting apparatus when said first comparison indicates that said calculated strength of impact is greater than said predetermined strength of impact and said second comparison indicates that said second detected acceleration is greater than said predetermined acceleration;

outputting a diagnosis signal indicating a strength of impact greater than said predetermined strength of impact when said second comparison indicates that said second detected acceleration is less than or equal to said predetermined acceleration; and diagnosing whether said crew protecting apparatus is operating normally or abnormally when said diagnosis signal is output.

21. The method of claim 20, wherein said enabling step includes the step of turning on a switch means when said first comparison indicates that said calculated strength of impact is greater than said predetermined strength and said second comparison indicates that said second detected acceleration is greater than said predetermined acceleration to enable said crew protecting apparatus.

22. The method of claim 21, wherein said diagnosing step comprises the steps of:

detecting a voltage at one end of said switching means; and determining that said crew protecting apparatus is operating abnormally when said detected voltage is greater than a first predetermined voltage.

23. The method of claim 20, further comprising the step of:

interrupting said diagnosing step when said second comparison indicates that said second detected acceleration is greater than said predetermined acceleration.

24. The method of claim 20, further comprising the step of:

third comparing said first detected acceleration to a second predetermined acceleration; and interrupting said diagnosing step when said third comparison indicates that said first detected acceleration is greater than said second predetermined acceleration.

25. An apparatus for diagnosing a crew protecting apparatus, comprising:

first detecting means for detecting vehicle acceleration;

calculating means for calculating a strength of impact of the vehicle based on said first detected vehicle acceleration;

first comparing means for comparing said calculated strength of impact to a predetermined strength;

second detecting means for detecting vehicle acceleration;

second comparing means for comparing said second detected vehicle acceleration to a predetermined acceleration;

enabling means for enabling said crew protecting apparatus when said first comparing means indicates that said calculated strength of impact is greater than said predetermined strength and said second comparing means indicates that said second detected acceleration is greater than said predetermined acceleration;

signal generating means for generating a diagnosis signal indicating a strength of impact greater than said predetermined strength when said second comparing means indicates that said second detected acceleration is less than or equal to said predetermined acceleration; and diagnosing means for diagnosing whether said crew protecting apparatus is operating normally or abnormally when said diagnosis signal is output.

26. The apparatus of claim 25, further comprising:

switch means for activating said crew protecting apparatus in an on state; and wherein said enabling means places said switch means in said on state when said first comparing means indicates that said calculated strength of impact is greater than said predetermined strength and said second comparing means indicates that said second detected acceleration is greater than said predetermined acceleration.

27. The apparatus of claim 26, further comprising:

detecting means for detecting a voltage at one end of said switching means; and wherein said diagnosing means determines that said crew protecting apparatus is operating abnormally when said detected voltage is greater than a first predetermined voltage.

28. The apparatus of claim 27, further comprising:

indicating means for indicating to a vehicle operator when said diagnosing means determines that said crew protecting apparatus is operating abnormally.

29. The apparatus of claim 26, wherein said switch means is a transistor.

30. The apparatus of claim 25, further comprising:

interrupting means for interrupting said diagnosing means when said second comparing means indicates that said second detected acceleration is greater than said predetermined acceleration.

31. The apparatus of claim 25, further comprising:
third comparing means for comparing said first detected acceleration to a second predetermined acceleration; and
interrupting means for interrupting said diagnosing means when said third comparing means indicates that said first detected acceleration is greater than said second predetermined acceleration.

32. The apparatus of claim 25, wherein said first detecting means is an acceleration G sensor.

33. The apparatus of claim 25, wherein said second detecting means is a mechanical G sensor.

34. The apparatus of claim 25, wherein said calculating means includes an integrator for integrating said first detected acceleration.

35. The apparatus of claim 25, wherein said diagnosing means includes a microprocessor.

* * * * *